United States Patent
Silberfenig et al.

(10) Patent No.: US 7,035,666 B2
(45) Date of Patent: Apr. 25, 2006

(54) COMBINATION CELLULAR TELEPHONE, SOUND STORAGE DEVICE, AND EMAIL COMMUNICATION DEVICE

(75) Inventors: Shimon Silberfenig, Van Nuys, CA (US); Eric Karich, Fountain Valley, CA (US)

(73) Assignee: Shimon Silberfening, Van Nuys, CA (US)

( * ) Notice: Subject to any disclaimer, the term of this patent is extended or adjusted under 35 U.S.C. 154(b) by 702 days.

(21) Appl. No.: 09/874,614

(22) Filed: Jun. 4, 2001

(65) Prior Publication Data

US 2001/0041590 A1    Nov. 15, 2001

Related U.S. Application Data

(63) Continuation-in-part of application No. 09/329,562, filed on Jun. 9, 1999, now Pat. No. 6,243,594.

(51) Int. Cl.
*H04M 1/00*    (2006.01)

(52) U.S. Cl. ............... 455/556.1; 455/412.1; 455/412.2; 455/413

(58) Field of Classification Search ............ 455/412.1, 455/413.1, 556.2, 556.1, 557, 412.2, 413, 455/423.1; 379/88.11, 88.13, 88.14, 88.17, 379/88.26
See application file for complete search history.

(56) References Cited

U.S. PATENT DOCUMENTS

| | | | |
|---|---|---|---|
| 5,687,220 A * | 11/1997 | Finnigan | 379/67 |
| 5,802,460 A | 9/1998 | Parvulescu et al. | |
| 5,867,793 A | 2/1999 | Davis | |
| 5,890,074 A | 3/1999 | Rydbeck et al. | |
| 5,950,167 A | 9/1999 | Yaker | |
| 5,963,618 A | 10/1999 | Porter | |
| 5,995,824 A | 11/1999 | Whitfield | |
| 6,021,325 A | 2/2000 | Hall | |
| 6,047,272 A | 4/2000 | Biliris et al. | |
| 6,138,036 A * | 10/2000 | O'Cinneide | 455/557 |
| 6,151,507 A | 11/2000 | Laiho et al. | |
| 6,169,911 B1 | 1/2001 | Wagner et al. | |
| 6,230,003 B1 * | 5/2001 | Macor | 455/412.2 |
| 6,304,573 B1 * | 10/2001 | Hicks, III | 370/401 |
| 6,351,523 B1 * | 2/2002 | Detlef | 379/88.14 |
| 6,401,113 B1 * | 6/2002 | Lazaridis et al. | 709/207 |
| 6,771,949 B1 * | 8/2004 | Corliss | 455/413 |

FOREIGN PATENT DOCUMENTS

WO    WO99/11048    3/1999

* cited by examiner

*Primary Examiner*—Bing Q. Bui
(74) *Attorney, Agent, or Firm*—Eric Karich

(57) ABSTRACT

A combination cellular telephone, sound storage device, and email communication device, used to make or receive a voice message while talking on the cellular telephone and then transmit the voice message to an email address, has microphone, a speaker, and a transmitter/receiver that are operatively connected to a controller. The controller is further operably connected to a voice recorder memory that enables a voice message to be recorded, and an email address memory that stores at least one email address. The combination functions to transmit the voice message associated with the at least one email address such that the voice message is delivered to the email address.

2 Claims, 4 Drawing Sheets

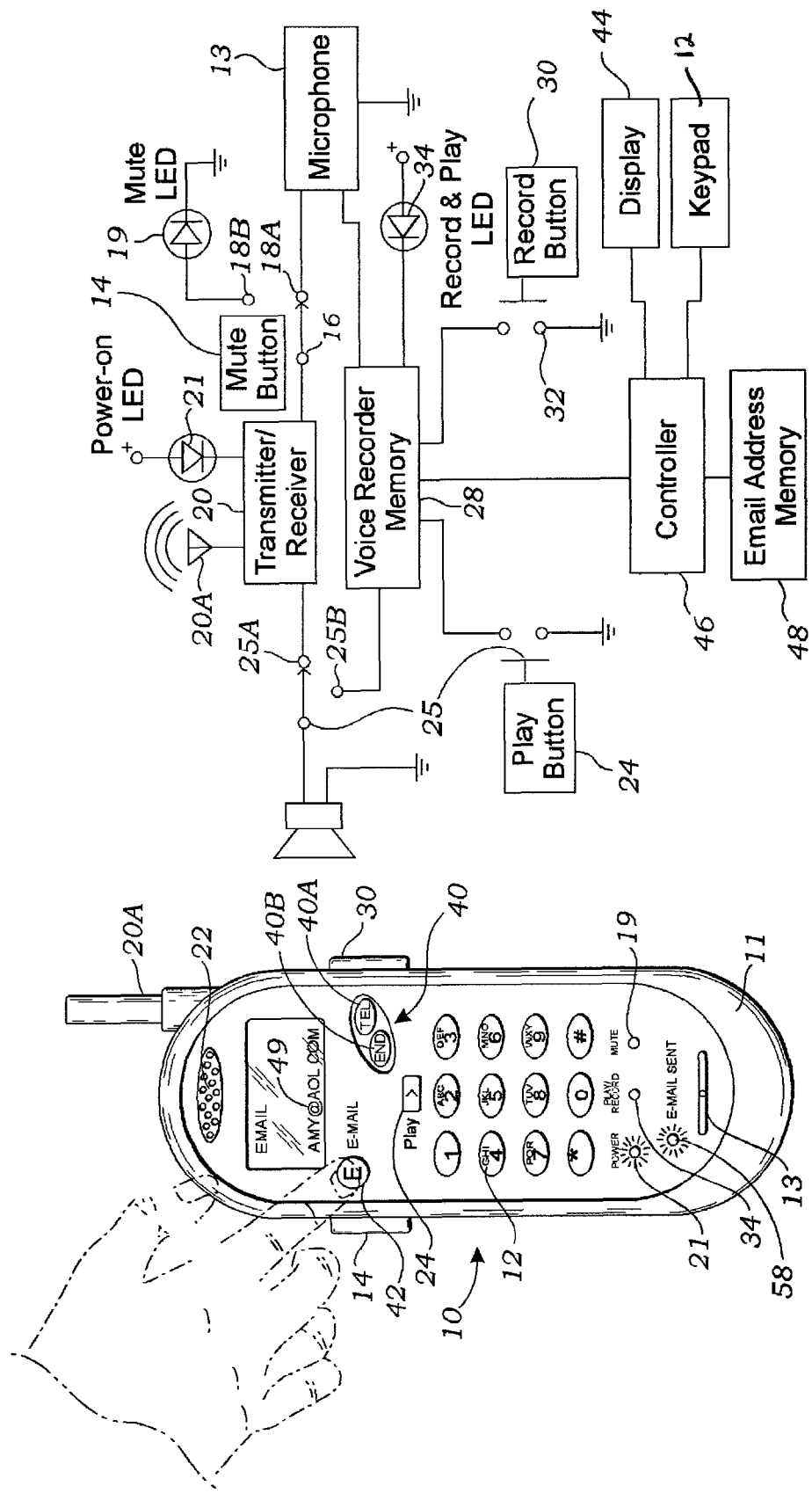

COMBINATION CELLULAR TELEPHONE, SOUND STORAGE DEVICE, AND EMAIL COMMUNICATION DEVICE

CROSS-REFERENCE TO RELATED APPLICATIONS

This application for a utility patent is a continuation-in-part of a previously filed utility patent having the application Ser. No. 09/329,562, filed Jun. 9, 1999, now U.S. Pat. No. 6,243,594.

STATEMENT REGARDING FEDERALLY SPONSORED RESEARCH

Not Applicable

BACKGROUND OF THE INVENTION

1. Field of the Invention

This invention relates generally to cellular telephones, and more particularly to a cellular telephone having a voice recorder memory for recording a voice message, and an email address memory for storing an email address so that the voice message can be forwarded to the email address.

2. Description of Related Art

The prior art includes various cellular telephones that include a voice recorder memory for recording voice messages while the user is talking on the cellular telephone. The most preferred cellular telephone of this type, shown in Silberfenig, U.S. Pat. No. 6,243,594, teaches a combination cellular telephone and sound storage device that enables the user to make confidential notes to himself while talking on the telephone and later play the messages back. This is useful for many purposes, including taking down phone numbers, driving directions, and even making notes about the conversation, including notes that are confidential and that the user does not want the other party to hear. At a later time, when convenient, the user can replay the notes and write down important information.

Another cellular telephone that enables the user to record notes is taught in Whitfield, U.S. Pat. No. 5,995,824. The Whitfield cellular telephone, unlike the Silberfenig device, records the entire conversation and does not allow the user to make confidential notes to himself, or exclude the other party from being recorded. The Whitfield cellular telephone also includes the capability to record the conversation to a voice mailbox. This is useful because it transfers the message to a location where the user is expecting to receive and record messages. However, the user is not able to route a message to different locations, so the feature is of limited value.

Various additional electronics products are also known in the art. A cellular telephone having call answering circuitry is taught by Helferich et al., US, RE.34,976, which describes an analog-to-digital voice storage cellular telephone for recording voice messages while the user is away from the cellular telephone unit. In a preferred embodiment, the analog-to-digital voice storage cellular comprises call-answering circuitry which is activated after a predetermined number of rings. Detection circuitry waits to detect an SAT signal during a preset period of time. Once the SAT signal is detected a prerecorded outgoing message is transmitted to the caller. The voice storage cellular telephone records incoming voice messages, which are retrieved and replayed by users at their convenience. If the SAT signal is not detected, call-terminating circuitry immediately terminates the call. In accordance with one aspect, voice messages may be recorded at the central cellular station in real time, subsequently transmitted to the voice storage cellular telephone at a high speed and reproduced at normal speed to reduce air transmission time and cost.

Burke et al., U.S. Pat. No. 4,468,813 describes a digital voice storage system adapted for use in a multiple unit land mobile radio communications system. The system utilizes a PSK signaling system with fixed length data packets to control a system capable of multiple message storage of speech at mobile stations. Up to eight 64K dynamic RAMS are used in conjunction with a microprocessor to store up to 42 seconds of speech comprising up to eight separate messages. In addition, the system permits base interrogation of mobiles to determine if a message has been stored for review by the base operator and to determine the remaining recording capacity and total recording capacity of the mobile.

Lee, U.S. Pat. No. 4,500,752 describes a cordless telephone with a normal tape recorder or micro-cassette tape recorder operated by touch and is coupled to the main body of the telephone. The tape recorder operates on a cordless remote-control unit at remote distances from the basic unit by means of a control switch (record, play basic, rewind, fast forward, stop) attached to the remote unit. This arrangement provides a remote control record/play back cordless telephone. The remote unit includes a digital encode circuit that converts the signal of a selected function for control switch into a digital signal corresponding to the selected function, FM-modulates and amplifies said digital signal, and then cordlessly transmits it to the base unit. On the other hand, the base unit includes a complementary digital decode circuit and transceiver.

Nagata et al., U.S. Pat. No. 4,677,657 describes a voice recording card that can record and reproduce a message and when it is inserted into a transmitting and receiving apparatus it can transmit and receive the message. In a recording mode, the message is applied through a microphone, converted into digital signal by an analog/digital converter and is recorded in a memory and is transmitted through an interface to the transmitting and receiving apparatus. In a receiving mode, the content of the message received by the transmitting and receiving apparatus is recorded in the memory through the interface and is read out, in a reproduction mode, from the memory and converted into an analog signal by a digital-analog converter to be outputted from a speaker. The card comprises a central processing unit that controls an electric structure of the card in response to the mode designated by a mode designation key included in a keyboard.

Nagashima, U.S. Pat. No. 5,444,761 describes an on-vehicle mobile radio telephone with an answering function, having the capability to automatically change the phone mode to an answer mode even if an occupant forgets to set an answer mode switch when leaving a vehicle and does not shift from phone mode to the answer mode while the vehicle is in motion. The on-vehicle mobile radio telephone with an answering function includes a message recording device; a handset; a channel for relaying a call signal to the handset; a call detecting device for detecting a call through the channel to generate a call detect signal; and a control device for executing an automatic reception mode to connect the channel to the message recording device according to the call detect signal with an answer mode designated. The control device includes an accessory switch (ACC) detecting device for detecting whether an accessory switch of a vehicle is on or off, whereby the automatic reception mode is initiated when the accessory switch (ACC) detecting device detects that the accessory switch is off.

Parvulescu et al., U.S. Pat. No. 5,802,460 describes a telephone handset and remote controller apparatus for transmitting information such as phone numbers and addresses for storing in a messaging device. The telephone handset and remote controller apparatus includes a housing and a plurality of actuators disposed on the housing for allowing information to be input into memory in the telephone handset and remote controller apparatus and to allow control of the operation of the telephone handset and remote controller apparatus. A radio-frequency transceiver included in the telephone handset and remote controller apparatus is responsive to the actuation of the actuators, and transmits a television control signal for controlling a television actuators, transmits a first radio-frequency signal encoded with the information in response to actuation of at least a second of the actuators, and transmits to the messaging device, a second radio-frequency signal encoded with the information in response to actuation of at least one-third of the actuators. The radio-frequency transceiver in the telephone handset and remote controller apparatus receives radio-frequency communication signals from an associated base station, and if the messaging device is bi-directional, also receives messaging signals from the messaging device. The telephone handset and remote controller apparatus may also have a data connector so that it may be connected to a computer in order to receive downloaded information such as software updates and the like and transmit such information to the messaging device.

Kohler, International, WO 90/13196 describes a device for telecommunication systems, in particular a telephone or radio set, or telephone station of a two-way intercom system, with a component containing at least one loudspeaker and one microphone, is designed to be held in the hand during use. An electronic device preferably a dictaphone unit, comprising a driver for a recording medium a recording and play-back unit and associated operating elements, a radio receiver unit, a personal call receiver, a device for remote polling of devices such as alarm systems, sensors, etc., a TV set, an answering machine or a device which plays and records messages, an answering machine or a device which plays and records messages, an electronic storage device or an acoustic room-monitoring device, preferably with display, is incorporated into the component and coupled electrically to the latter. Alternatively, the component is designed to be coupled mechanically and electrically to the electronic device.

The above-described references, hereby incorporated by reference, teach cellular telephones that record messages. However, the prior art does not teach a cellular telephone that allows a user to record voice messages made by the user while he or she is talking in the cellular telephone, and then forward the voice messages of one or more of a plurality of other persons via email. The present invention fulfills these needs and provides further related advantages as described in the following summary.

SUMMARY OF THE INVENTION

The present invention teaches certain benefits in construction and use which give rise to the objectives described below.

The present invention provides a combination cellular telephone, sound storage device, and email communication device, and a method of using the combination to make or receive a voice message while talking on the cellular telephone, the method further including the steps of transmitting the voice message to an email address. The combination includes a microphone, a speaker, and a transmitter/receiver that are operatively connected to a controller. The controller is further operably connected to a voice recorder memory that enables a voice message to be recorded, and an email address memory that stores at least one email address. The combination functions to transmit the voice message associated with the at least one email address such that the voice message is delivered to the email address.

A primary objective of the present invention is to provide a combination cellular telephone, sound storage device, and email communication device having advantages not taught by the prior art.

Another objective is to provide a device that enables a user to make a voice message while talking on a cellular telephone without interrupting the conversation or otherwise interrupting the user's activities, and then forward the voice message of one or more of a plurality of other persons via email.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a front elevational view of the preferred embodiment of a combination cellular telephone, sound storage device and email communication device;

FIG. 2 is a schematic block diagram of a first embodiment thereof;

DETAILED DESCRIPTION OF THE INVENTION

Figure 3:
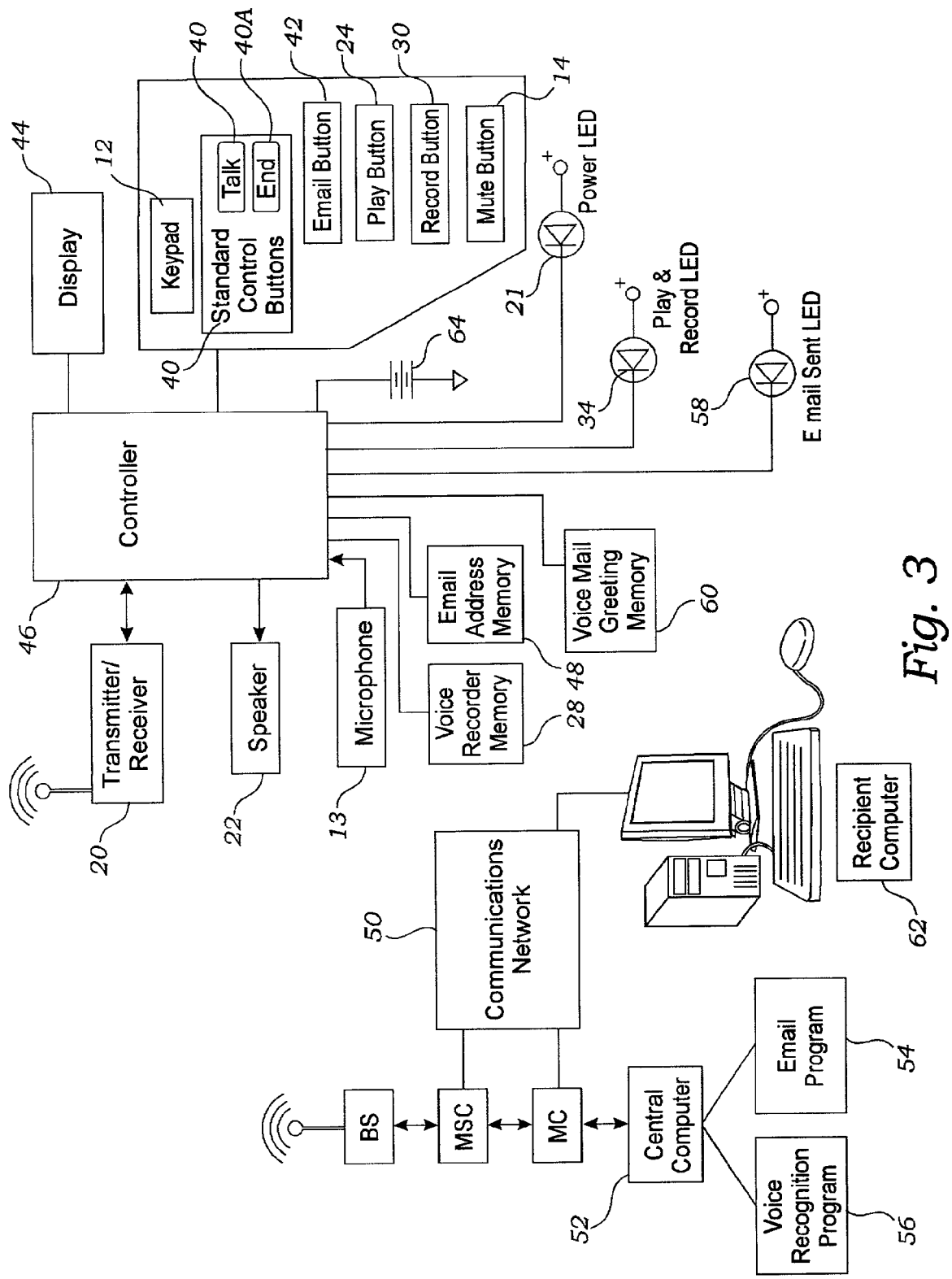
FIG. 3 is a schematic block diagram of a second embodiment thereof.

The above described drawing figures illustrate the invention, a combination cellular telephone, sound storage device and email communication device 10. The combination 10 includes a voice recorder memory 28 for recording a voice message, and an email address memory 48 for storing an email address 49 so that the voice message can be forwarded to the email address 49.

As shown in FIG. 1, the combination 10 includes a microphone 13 and a speaker 22 operably positioned for enabling a user to utilize the combination 10 as a cellular telephone. The microphone 13 and the speaker 22 are mounted within a molded plastic housing 11 that includes a traditional keypad 12 for dialing as with any ordinary cellular telephone. The housing 11 further includes standard control buttons 40, including a talk button 40A and an end button 40B, for facilitating the ordinary function of the digital or cellular telephone, including initiating calls, terminating calls, and any of the many other features that are well known in the art.

In many respects, the combination 10 is similar to a cellular telephone; however, in addition to the various buttons commonly found on a cellular telephone, the combination 10 further includes an email button 42, a mute button 14, a play button 24, and a record button 30, for controlling the special functions of the combination 10, described below. While the combination 10 is compared to a cellular telephone, other portable communications devices, PDAs, digital telephones, radiophones, and other similar communication devices could be adapted to this invention and should be considered equivalent to the described invention.

Also shown in FIG. 1, the combination 10 includes a display 44, preferably an LCD display that is approximately 1 inch high and 1.5 inches wide. The display 44 is operably connected to the controller 46 for displaying useful information to the user, including the number that the user has dialed, the number of an incoming call, and an email address 49 entered by the user for receipt of the voice message. The combination 10 further includes a mute LED 19, a power LED 21, a play and record LED 34, and an email sent LED 58, described in greater detail below, for enabling the user to quickly and easily ascertain when the various features of the combination 10 are in use.

As shown in FIGS. 2 and 3, the microphone 13 and the speaker 22 are operably connected to an electronics package that includes a transmitter/receiver 20, a voice recorder memory 28, and an email address memory 48. The electronics package also preferably includes additional elements, described in greater detail below. The transmitter/receiver 20 is generally equivalent to a standard transmitter/receiver used in any cellular telephone and is therefore not described in further detail. The voice recorder memory 28 is operatively connected to a controller 46 that is operatively connected to an email address memory 48, a display 44, and a keypad 12 that enable the recording and transmission of the voice message, as described below.

In a first embodiment, as shown in FIG. 2, the microphone 13 is operably connected to the transmitter/receiver 20 through a mute switch 16. The mute switch 16 preferably is biased towards a transmit position 18*a* in which the circuit connecting the microphone 13 to the transmitter/receiver 20 is closed. The mute button 14 operates to move the mute switch 16 from the transmit position 18*a* to a mute position 18*b* when pressed. The mute switch 16 is preferably operatively connected to the mute LED 19 when in the mute position 18*b*. A speaker 22 is also operatively connected to the transmitter/receiver 20 through a play switch 25. The play switch 25 is biased towards a resting position 25*a*, in which the circuit connecting the speaker 22 and the transmitter/receiver 20 is closed and the speaker 22 emits sounds received from the transmitter/receiver 20. In its preferred embodiment, the power source (not shown) is connected to the transmitter/receiver 20 through a power LED 21 to allow easy visual confirmation that the device is operating. The transmitter/receiver 20 includes an antenna 20*a* to enhance the sending and reception of signals. All of these elements are well known in the art and do not require detailed description.

A voice recorder memory 28 is also operatively connectable to both the microphone 13 and the speaker 22. In one embodiment, the voice recorder memory 28 is a non-volatile analog sound recording chip such as manufactured by Information Storage Devices, Inc. of San Jose, Calif. The voice recorder memory 28 preferably provides at least one minute of audio storage, although greater storage capacities should become common as technology progresses. In another embodiment, the voice recorder memory 28 is a digital memory chip. In any case, at some point in the electronics package, an analog to digital converter (not shown) is required. The circuit between the voice recorder memory 28 and the microphone 13 is operatively controlled by a record switch 32. When a record button 30 moves the record switch 32 from a non-recording position to a recording position, the circuit between the microphone 13 and the voice recorder memory 28 is completed and sounds detected by the microphone 13, such as a voice message, are recorded on the voice recorder memory 28.

The circuit between the voice recorder memory 28 and the speaker 22 is operatively controlled by a play button 24. The play button 24 operates to move the play switch 25 described above from the resting position 25*a* to a playing position 25*b* when pressed. When the play switch 25 is moved to the playing position 25*b*, the circuit connecting the speaker 22 and the transmitter/receiver 20 is broken and the speaker 22 is instead operatively connected to the voice recorder memory 28. When the voice recorder memory 28 is operatively connected to the speaker 22, the speaker 22 plays the recording of the voice message that was recorded on the voice recorder memory 28. In its preferred embodiment, the voice recorder memory 28 is electronically connected to a play and record LED 34. Whenever the voice recorder memory 28 draws current, to either record a voice message or to play the voice message, the play and record LED 34 lights up to provide visual confirmation or warning that the voice recorder memory 28 is active. The voice recorder memory 28 is preferably not operatively connected to the transmitter/receiver 20, as in the prior art. By not connecting the voice recorder memory 28 to the transmitter/receiver 20, this combination 10 allows the user to record his or her own voice message without inadvertently recording the other user. Since privacy is a big concern in today's society and the unauthorized recording of a conversation is illegal, this feature is an important element of this invention. Additional elements, such as fast-forward, rewind, and message selection features can be added without altering the spirit of this invention; however, the addition of these features is not presently desired due to the increased cost, bulk, and complexity.

The voice recorder memory 28 is operatively connected to the controller 46 which is operatively connected to the email address memory 48, the display 44, and the keypad 12. The email address memory 48 can be provided as part of the same chip as the voice recorder memory 28, or they can be separate chips. The user enters the email address 49 using the keypad 12, and the email address 49 is stored in the email address memory 48 by the controller 46. This functional aspect of the combination 10 is described in greater detail below.

In use, this combination 10 provides a method for recording the voice message of the user talking on a cellular telephone with another person. The user first uses the combination 10 to call (or receive a call from) the other person. The above-described combination 10 functions as a traditional cellular telephone in this respect: the user simply speaks into the microphone 13 so that the speech is transmitted by the transmitter/receiver 20 to the other person. The speaker 22 can also listen to the responses of the other person via the speaker 22, as received by the transmitter/receiver 20. As often occurs during the course of a conversation, however, the user may wish to make a note of something said by the other person, such as a telephone number or directions to a certain location. However, it is often not possible to make written notes while talking on the phone. Many people talk on the phone while driving or otherwise occupied, and cannot stop to take notes.

By pressing the record button 30, which is preferably located on the side of the combination 10, the record switch 32 is moved from a non-recording position to a recording position, thereby operatively connecting the microphone 13 to the voice recorder memory 28. The user then speaks into the microphone 13, repeating the phone number for instance, thereby recording the voice message received by the microphone 13 on the voice recorder memory 28 while simultaneously transmitting the voice message through the transmitter/receiver 20 to the other person. This allows the conversation between the user and the other person to continue uninterrupted while the user takes notes. This also allows the user to make notes while engaged in other activities without being distracted by trying to write the notes down. This can provide an important safety benefit to people who talk on their cell phones while driving or engaging in similar behavior. This combination 10 also provides the benefit of recording the user without recording the other person to whom the user is talking. It is important, for the privacy of the other person that the other person's voice is not recorded while this recording is made, due to the privacy concerns noted above.

Sometimes, however, the user may wish to make voice messages during the conversation that the other person cannot hear. The combination 10 therefore preferably provides a mute button 14 that functions to move the mute switch 16 from the transmit position 18a to a mute position 18b, thereby preventing the voice message from being transmitted to the other person. By holding both the record button 30 and the mute button 14, the user can make voice messages on the voice recorder memory 28 without transmitting the voice message through the transmitter/receiver 20 to the other person. The user can then release the mute button 14 at any time, thereby allowing the mute switch 16 to return to the transmit position 18a and reestablishing the operative engagement of the microphone 13 to the transmitter/receiver 20. Of course, the user can discontinue recording by releasing the record button 30, thereby allowing the record switch 32 from a recording position to a non-recording position and halting the recording. When the user desires to remember the voice message recorded on the voice recorder memory 28, after terminating the call with the other person 6, the user can simply wait until it is convenient and press the play button 24, thereby operating to move the play switch 25 from the resting position 25a to a playing position 25b and transmitting the voice message from the voice recorder memory 28 to the speaker 22. Upon listening to the voice message, the user can write the information down, dial the phone number, or take any other action that is appropriate.

In addition to the option of listening to the voice message, the user also has the option of transmitting the voice message to the email address 49 so that the voice message can be transmitted to, referenced by, and stored by either the user at another location, or by at least one other person, and potentially by many other persons. This aspect of the invention is described in greater detail below.

In a second embodiment, as shown in FIG. 3, the controller 46 is operably connected to a power source 64, such as a battery, the microphone 13, the speaker 22, and the transmitter/receiver 20 for enabling cellular telephone communications, as well known in the art. The controller 46 is also operatively connected to the display 44 and the keypad 12 for facilitating control of the transmitter/receiver 20, as described above. The keypad 12 preferably includes a plurality of standard numbered keys (0–9) and related keys (*, #) that enable the user to use the combination 10 to place a telephone call. In use, the user enters the phone number into the combination 10 using the keypad 12 and the numbers are displayed on the display 44. The user can place the call by pressing the talk button 40A, and the call is terminated by pressing the end button 40B, although any of a plurality of standard control buttons 40 could be used for this function. The controller 46 utilizes the microphone 13, the speaker 22, and the transmitter/receiver 20 to enable the phone call to be placed through a base station BS, the base station BS being operatively connected to a communications network 50 that includes a message switch center MSC and a message center MC. The message center MC preferably includes a central computer 52 whose function is described in greater detail below. The communications network 50 used to enable cellular telephone communications, described in Laiho et al., U.S. Pat. No. 6,151,507, hereby incorporated by reference, is well known to those skilled in the art and is therefore not discussed in greater detail.

During the course of the telephone conversation, the user might receive information that he or she would like to save for future use, or to transmit to another person. Obvious examples would include directions to a location, a phone number or other contact information of an important new contact, or any information that a person might hear on a telephone and later want to remember. To facilitate collection and use of this type of data, the controller 46 is operatively connected to the voice recorder memory 28 for enabling the user to record the voice message.

The combination 10 can include one of many different mechanisms known in the art for recording the voice message onto the voice recorder memory. One mechanism is the selective mechanism described in Silberfenig, U.S. Pat. No. 6,243,594. Another mechanism might include a general recording mechanism for simply recording both sides of a conversation over the combination 10, as shown in Davis, U.S. Pat. No. 5,867,793, and Whitfield, U.S. Pat. No. 5,995,824, hereby incorporated by reference. Another mechanism might include a more sophisticated series of buffers, such as disclosed in Hall, U.S. Pat. No. 6,021,325, hereby incorporated by reference. The mechanism might also show the use of the combination 10 as a dictating machine when the user is not even talking on the telephone. All of these various mechanisms shown in the art can be adapted to practice the present invention, and are within the scope of the claimed invention.

To enable the email function of the combination 10, the controller 46 is operatively connected to the email address memory 48 and a means for receiving an email address 49 into the email address memory 48. The email address memory 48 is preferably a non-volatile memory chip whose construction is well known in the art. In the preferred example, the means for receiving is provided by the keypad 12, the display 44, and the controller 46, that together enable the user to enter the email address 49 into the email address memory 48. Other options include the attachment of a separate data entry mechanism, such as a keyboard (not shown), to the combination 10; use of voice recognition software and the microphone 13 to verbally enter the email address 49; and use of a touch screen (not shown) to enter the email address 49 with a stylus. These options, and many other data entry techniques, should be considered within the scope of the claimed invention.

Figure 4:
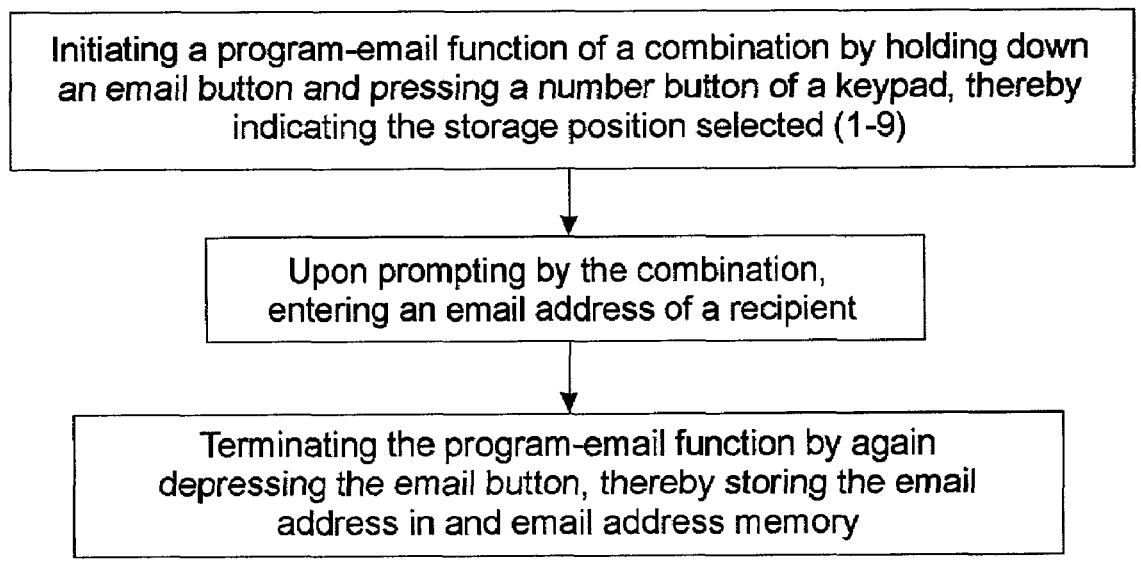
FIG. 4 is a flow diagram illustrating the input of an email address into an email address memory of the combination.

In the preferred embodiment, as shown in FIG. 4, the user email address 49 is entered using a program-email function through the keypad 12. The program-email function is executed by pressing and holding down the email button 42, although those skilled in the art could devise a variety of function buttons or button sequences that would trigger this function. Once the function was triggered, the user could either enter the email address 49 directly, or the user could first select one of a plurality of storage spaces within the email address memory 48 for storage of the email address 49. In this example, the combination prompts the user to select a number between 1–9, thereby selecting the slot in which the current email address 49 will be saved. Once saved, the email address 49 can be recalled simply by designating which of the storage slots should be referenced.

Once the user has selected a slot (number 1, for example), the numbers and letters of the email address 49 are entered using techniques well known in the art. The number 2 button, for example, commonly includes the letters A, B, and C, and pressing the number 2 button once enters the A, pressing it twice enters the B, and pressing it three times enters the C. This is well known, and therefore not discussed in greater detail. Once the email address 49 was completely entered, another function button could be used to save the email address 49 into the email address memory 48. In the current example, the program email function is terminated and the email address 49 is stored when the email button 42 is pressed a second time. The email address 49 can be the address used by the user, so the user can send notes to himself, or the address used by a coworker or other person who the user might want to send messages, such as a certain department of the user's company. This mechanism is similar to the present technology used to store phone numbers into a phone memory for auto-dialing of certain phone numbers. In the present case, however, the email address memory 48 stores the email address 49 rather than a telephone number.

Further options can be added to the above-described format. Data can be imported from a personal computer so that more complex email structures can be devised and edited. For example, one slot in the email address memory might be programmed to include many email addresses.

The combination further includes a means for transmitting the voice message and the email address 49, the email address 49 being associated with the voice message such that the voice message can be delivered as directed by the email address 49. Those skilled in the art can devise the software necessary to enable such communication. The voice message is preferably already in digital form, or it can be readily converted into an acceptable digital format using an A/D converter (not shown). The email address 49 can be associated in many ways. In one embodiment, the combination 10 includes an email program 54 that can compose the email message with the email address 49 properly positioned in the header, and with the voice message associated as an attachment.

In another embodiment, the data is first transmitted to a central computer 52 of the message center MC, and the central computer 52 contains the email program 54, such as MICROSOFT® OUTLOOK® or EUDORA®, that functions to format the data and transmit the email message. In the preferred embodiment, the central computer 52 further includes a voice recognition program 56 that can convert the voice message into a text message for transmission to the recipient computer. Otherwise, the email can be sent with the voice message in audio form attached to the email as an attachment. In any case, the voice message should typically be saved for a period on the central computer 52 so that the recipient can request the original recording of the verbal message in case the text translation by the voice recognition program 56 is faulty.

In addition to enabling the user to transmit the email message 49 himself or herself, the combination 10 also enables the user to transmit the email message 49 to another person or group of persons. For example, a salesman who receives an order for a quantity of new product from a client might want to transmit this information to the warehouse manager so that ordered products could be shipped immediately. The order information could also be sent to the accounting department so that an invoice for the order could also be shipped. While conversing with the client, the salesman would simply press the record button 30 to record the order information, either directly from the client (with his permission), or from the salesman, who could press the mute button 14 and read the order information into the microphone 13 without the client even being aware. In the embodiment described in FIG. 2, the voice recorder memory 28 only records what the salesman says into the microphone 13. In the embodiment described in FIG. 3, the voice recorder memory 28 might record the entire conversation directly from the transmitter/receiver 20, depending upon the performance desired. The specific arrangement of what is recorded can be adjusted based upon the needs of the user. The inclusion of a mute button 14 further extends the options of the user. In one embodiment, the voice recorder memory 28 records only the microphone 13, so once the user presses the mute button 14, he or she can speak into the microphone 13 and record the voice message without the other person hearing the notes. While the salesman is speaking to the client, for example, the salesman could press the record button 30 and the mute button 14 and record a voice message that says that the client would like to order 100 units of product Z for delivery within 10 days. Additional information such as a shipping address could also be included.

Once the call is terminated, the user first has the option of replaying the voice message by pressing the play button 24 and reviewing the voice message. If the salesman is not happy with the recording, it is possible to re-record the voice message. If the salesman is satisfied, he or she can then route the information to the shipping department, the accounting department, and possibly also the user's own computer for record keeping.

Figure 5:
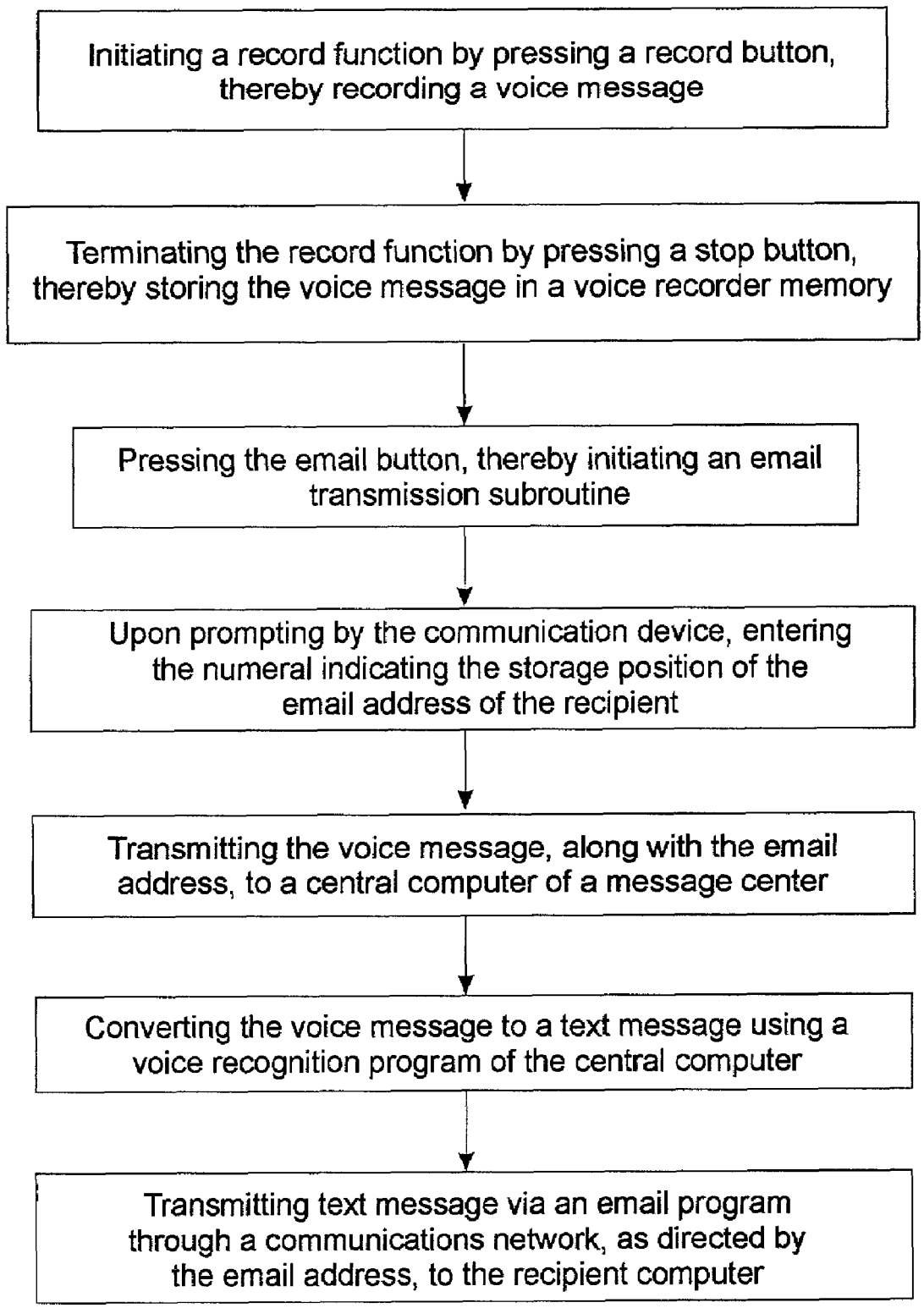
FIG. 5 is a flow diagram illustrating how a voice message is recorded onto a voice recorder memory and transmitted to the email address stored in the email address memory.

To forward the voice message to the other parties, the user simply enters the email address 49 of any appropriate person or corporate division (assuming that this has not already been done), as described above, and then initiates an email transmission subroutine, described in FIG. 5, preferably by pressing the email button 42 and pressing the number of the memory slot that contains the email address 49 or addresses desired.

Once transmitted, the voice message is received by the base station BS, as shown in FIG. 3. Since the structure of the communications network 50 is well known in the art, it is not described herein, except to note that the voice message and email address 49 are routed to the central computer 52 for processing as described above, from where it is transmitted to the recipient computer 62 (or fax machine, pager, or equivalent device).

As shown in FIG. 3, the combination 10 preferably further includes a voicemail greeting memory 60 that enables the user to store a voice greeting and function as an answering machine. In this embodiment, the combination 10 automatically answers a call if it is not answered within a specified number of rings. Once the combination 10 answers the call, the combination 10 plays the voice greeting stored on the voicemail greeting memory 60, and automatically route the voice message into the voice recorder memory 28. The combination 10 can then save the voice message for later playback, or the combination 10 can be programmed to automatically forward the voice message to the email address 49 specified for this purpose, presumably the email address 49 of the owner of the combination 10. In conjunction with the voice recognition program 56, this enables the user to receive all of his or her messages into the email account of his or her choice, much like an expensive answering service.

It is worth noting that while this application is focused on email delivery, equivalent delivery networks such as pagers and facsimile machines are also included in the scope of the following claims. For example, the email address is equivalent to a fax number, and the text translation of the verbal message could be delivered via the communications network to a facsimile machine. Such alternative, equivalent arrangements should be expressly considered within the scope of the present invention.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for recording a voice message and transmitting the voice message to an email address of a recipient, the method comprising the steps of:

providing a combination cellular telephone, sound storage device and email communication device, the combination comprising:

a controller operably connected to a power source, a microphone, a speaker, and a transmitter/receiver for enabling cellular telephone communications;

an email address memory operably connected to the controller;

a voicemail greeting memory operably connected to the controller; and a voice recorder memory operably connected to the controller;

storing an email address in the email address memory;

recording a voicemail greeting on the voicemail greeting memory;

receiving a call on the combination and automatically answering the call and playing the voicemail greeting;

recording a voice message onto the voice recorder memory through the transmitter/receiver upon completion of playing the voicemail greeting; and transmitting the voice message and the email address through the transmitter/receiver, the email address being associated with the voice message such that the voice message can be delivered as directed by the email address.

2. The method of claim 1 further comprising the steps of:

receiving the voice message and the email address at a message center;

converting the voice message into a text message;

composing an email including the text message and addressed to the email address; and transmitting the email such that the text message is delivered to the email address.

* * * * *